(12) United States Patent
Jeong (10) Patent No.: US 7,220,152 B2
(45) Date of Patent: May 22, 2007

(54) CONTACT FOR A PORTABLE ELECTRONIC DEVICE

(75) Inventor: Yi Seon Jeong, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/072,745

(22) Filed: Mar. 3, 2005

(65) Prior Publication Data

US 2006/0003634 A1 Jan. 5, 2006

(30) Foreign Application Priority Data

Jul. 2, 2004 (KR) ...................... 10-2004-0051614

(51) Int. Cl.
*H01R 4/48* (2006.01)

(52) U.S. Cl. ..................................... 439/862

(58) Field of Classification Search ................ 439/862, 439/66, 515, 67
See application file for complete search history.

(56) References Cited

U.S. PATENT DOCUMENTS

| | | | | |
|---|---|---|---|---|
| 4,370,012 A | * | 1/1983 | Grabbe et al. | 439/325 |
| 4,627,677 A | * | 12/1986 | Ono et al. | 439/75 |
| 6,257,899 B1 | * | 7/2001 | Walkup | 439/66 |
| 6,280,254 B1 | * | 8/2001 | Wu et al. | 439/630 |
| 6,398,559 B2 | * | 6/2002 | Tanaka | 439/66 |
| 6,409,529 B1 | | 6/2002 | Liu et al. | |
| 6,493,241 B1 | * | 12/2002 | Horng | 361/818 |
| 6,616,485 B2 | * | 9/2003 | Harasawa et al. | 439/630 |
| 6,869,299 B2 | * | 3/2005 | Tanaka et al. | 439/188 |
| 6,951,488 B2 | * | 10/2005 | Hsieh | 439/660 |

FOREIGN PATENT DOCUMENTS

| | | |
|---|---|---|
| JP | 2002/009912 A | 1/2002 |
| WO | WO 02/058258 A | 7/2002 |

* cited by examiner

*Primary Examiner*—Phuong Dinh
(74) *Attorney, Agent, or Firm*—Lee, Hong, Degerman, Kang & Schmadema P.C.

(57) ABSTRACT

An apparatus is disclosed for a contact for a portable electronic device. The contact comprises a first contact for maintaining elastic connectivity with the mating contact, a second contact for providing an elastic force to push the first contact toward the mating contact to support the first contact, and a member for mounting the first contact and the second contact.

2 Claims, 6 Drawing Sheets

CONTACT FOR A PORTABLE ELECTRONIC DEVICE

CROSS-REFERENCE TO RELATED APPLICATIONS

Pursuant to 35 U.S.C. § 119(a), this application claims the benefit of earlier filing date and right of priority to Korean Application No. 10-2004-00051614, filed on Jul. 2, 2004, the contents of which are hereby incorporated by reference herein in its entirety.

BACKGROUND OF THE INVENTION

1. Field of the Invention

The present invention relates to contacts, and more particularly, to a contact for a portable electronic device for connecting a battery and a component, or components in the portable electronic device, such as a cellular phone.

2. Description of the Related Art

Portable electronic devices, such as cellular phones, portable video and/or audio recorders, such as MP3 (MPEG Audio Layer-3) players, compact disc players, and cassette tape players, personal digital assistant (PDA), and laptop computers are popular among users. Portable electronic devices require an electrical power source available during transport and/or use in an outdoor setting. Portable electronic devices are provided with a battery. The battery is electrically connected to a component of the portable electronic device through a contact.

Figure 1:
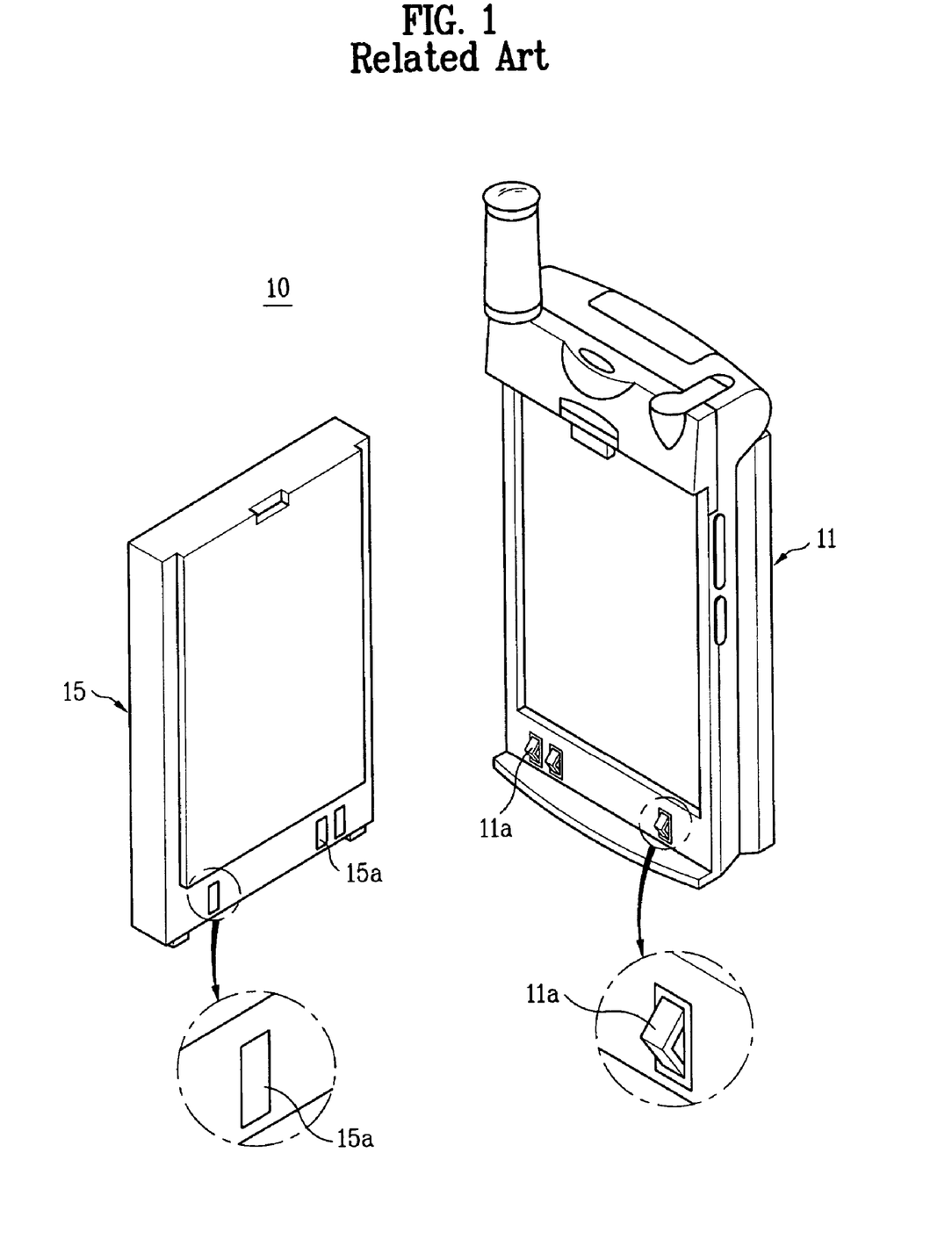
FIG. 1 illustrates a perspective view of a battery detached from a related art cell phone.

FIG. 1 illustrates a conventional portable electronic device. The conventional portable device 10 comprises a body 11 having a first contact 11a. A battery 15 is removably mounted on the body 11. The battery 15 has a second contact 15a. The first contact 11a and the second contact 15a are connected upon attachment of the body 11 with the battery 15. The first contact 11a provides a substantially right angle surface. The substantially right angle surface has a first face and a second face. When a second contact 15a presses again the substantially right angle surface of the first contact 11a, a first face or a second face of the first contact 11a pushes against the second contact 15a.

Figure 2:
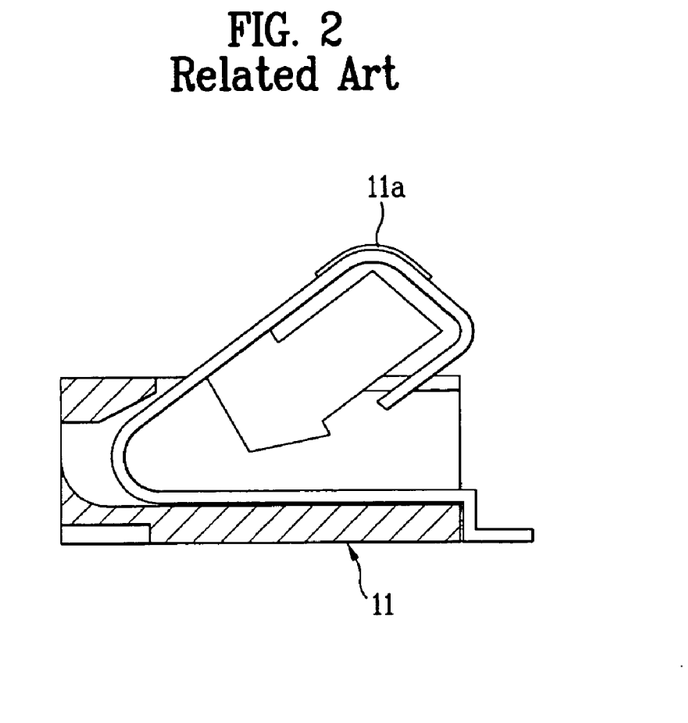
FIG. 2 illustrates a sectional view of a contact in a body of the cell phone illustrated in FIG. 1.

FIG. 2 is a second view of the portable device of FIG. 1. When the battery 15 is attached to the body 11, the first contact 11a pushes against the second contact 15a. The first contact 11a maintains contact with the second contact 15a using an elastic force while the battery 15 is attached to the body 11. The battery 15 supplies electricity to components of the portable device 10. While carrying the portable electronic device, the portable electronic device may fall on the ground or experience a large external impact. The first contact 11a may momentarily break connection with the second contact 15a when the battery 15 is attached to the body 11. The momentary break in power to the electronic device 10 may result in a loss of stored information, and in some cases may damage the electronic components of the electronic device 10.

Therefore, there is a need for an apparatus that overcomes the above problems and provides advantages over other apparatuses providing a power contact to a portable device.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention provides a contact for a portable electronic device to prevent breaking electric contact between a battery and a component of the portable electric device upon an external impact.

In one embodiment, a contact comprises a first contact for maintaining elastic connectivity with the mating contact, a second contact for providing an elastic force to push the first contact toward the mating contact to support the first contact, and a member for mounting the first contact and the second contact.

The first contact and the second contact are preferably mounted on at least one of a battery, a body, and a battery charger of the portable electronic device. The first contact preferably comprises a contact portion having a curved portion that is outwardly projected, and a first elastic portion for providing an elastic force to the contact portion. The second contact may be supported by at least one of an end portion and a middle portion of the first contact.

In another embodiment, an apparatus comprises means for providing a first elastic force from a first contact with the mating contact, means for providing a second elastic force from a second contact into the first contact to support the first contact, and means for mounting a member for securing the first contact and the second contact.

In yet another embodiment, a method comprises providing a first contact for maintaining an elastic force with a mating contact, pushing a second contact into the first contact toward the mating contact to support the first contact, and mounting a member for securing the first contact and the second contact on at least one of a battery, a body, or a battery charger of the portable electronic device.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

The invention will be described in detail with reference to the following drawings in which like reference numerals refer to like elements wherein.

DETAILED DESCRIPTION OF THE PREFERRED EMBODIMENTS

The invention relates to an apparatus for a contact of an electronic device, and more particularly, to a contact for connecting a battery and at least one component in the portable electronic device.

Although the invention is illustrated with respect to a mobile terminal, it is contemplated that the invention may be utilized anywhere it is desired for connecting contacts within a device having electronic components. Reference will now be made in detail to the preferred embodiments of the present invention, examples of which are illustrated in the accompanying drawings.

The present invention provides a first contact that contacts elastically with a mating contact. The present invention provides a second contact that elastically presses the first contact toward the mating contact. The second contact supplements the elastic force of the first contact to enhance the contact force between the first contact and the mating contact for preventing electrical disconnection of the battery and components or between components of a portable electronic device upon impact.

Figure 3A:
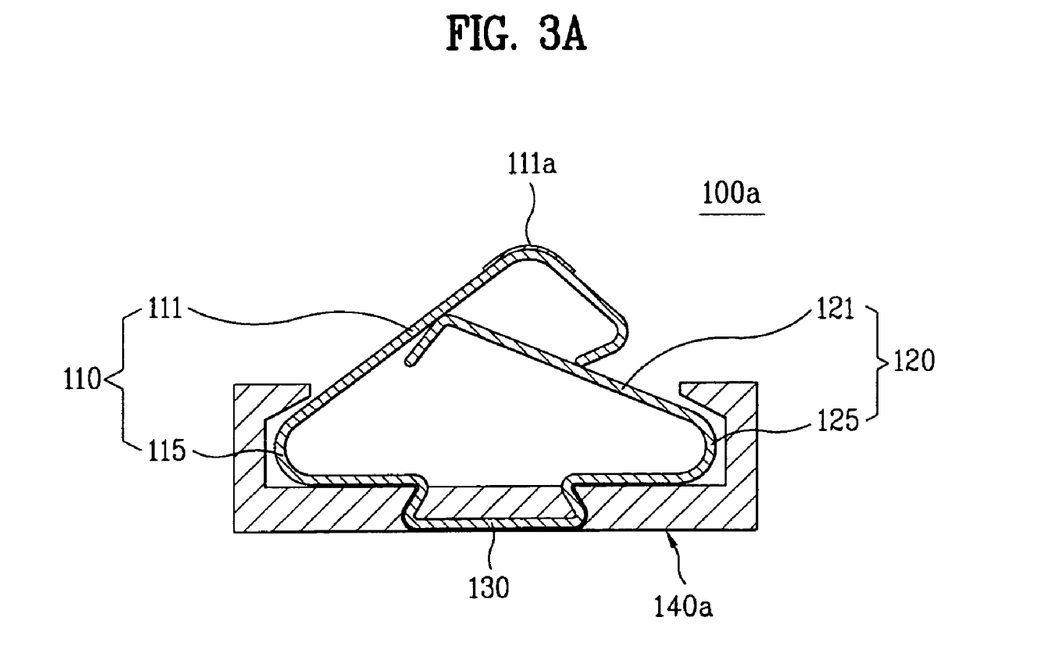
FIG. 3A illustrates a sectional view of a contact in accordance with a first preferred embodiment of the invention.
Figure 3B:
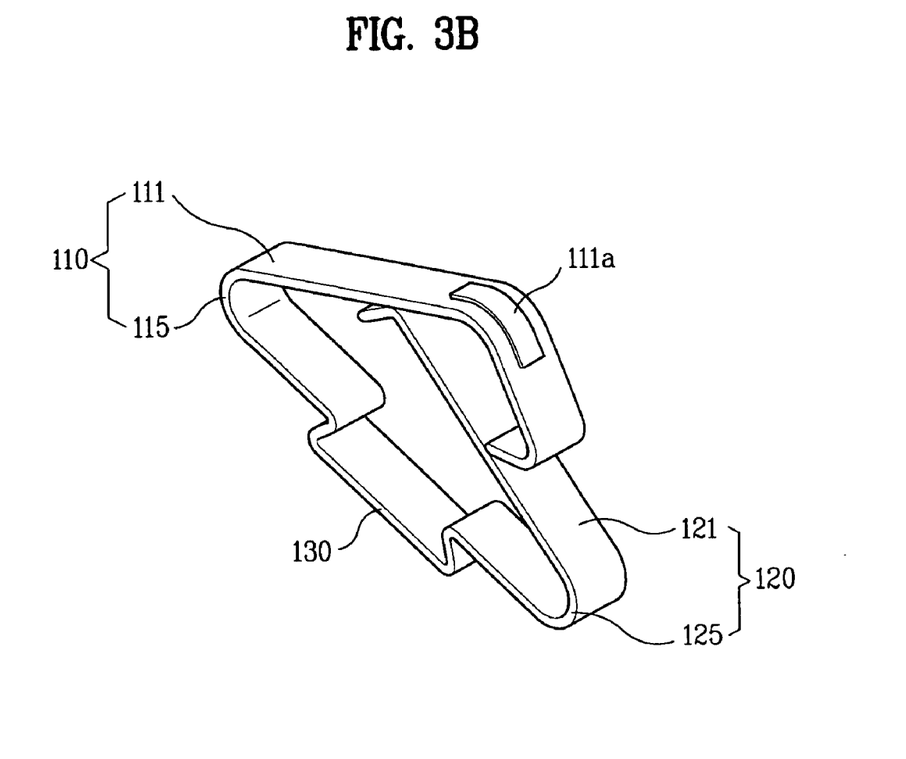
FIG. 3B illustrates a perspective view of a contact in FIG. 3A separated from the contact housing.

FIGS. 3A and 3B depict the contact 100a of a first embodiment of the invention. The contact 100a comprises a first contact 110 having a contact portion 111 and a first elastic portion 115. A second contact 120 is provided having a support portion 121, a second elastic portion 120, and a member having a connection portion 130 within a contact housing 140a.

The first contact 110 elastically presses down against a mating contact, for example, a flat surface. The contact portion 111 has a curved portion with an elongated ridge 111a outwardly projecting from the contact 100a. The elongated ridge 111a pushes, for example, on a small area with a high pressure on the mating contact, resulting in an end of the contact portion 111 being pushed inwardly. The first elastic portion 115 provides an elastic force along curved portion projecting outward from the contact portion 111 for pushing the contact portion 111 onto a mating contact.

In one example, a front or an upper surface of the first contact 110 contacts the mating contact. In this example, the second contact 120, arranged along a rear or under the first contact 110, supports the first contact 110 at a backside or underside thereof.

The support portion 121 pushes the first contact 110 to the mating contact to provide support for the first contact 110. The support portion 121 supports at least one of a middle portion and an end portion of the first contact 110. If the end portion of the support portion 121 is curved, the end portion and the middle portion of the support portion 121 contact respectively the middle portion and the end portion of the first contact 110.

Other configurations for the contact 101a are possible. The end portion of the support portion 121, for instance, may support the curved end portion or the middle portion of the first contact 110. In another example, the middle portion of the support portion 121 supports the curved portion of the first contact 110 when the first contact 110 presses down on a mating contact. The support portion 121 has at least one of the end portion and the middle portion of the support portion 121 elastically supporting the first contact 110. The second elastic portion 125 provides an elastic force to the support portion 121 along the curved member extending from the support portion 121.

The connection portion 130 connects the first contact 110 and the second contact 120. In one example, opposite end portions of the connection portion 130 are preferably connected to the first elastic portion 115 of the first contact 110, and to the second elastic portion 125 of the second contact 120. The connection portion preferably is formed as one unit with the first contact 110 and the second contact 120. The first contact 110, the second contact 120, and the connection portion 130 are preferably formed of a conductive material. The connection portion is fixedly secured to the contact housing 140a.

The contact housing 140a is provided to the battery or the body. The contact housing 140a may be, in one example, fabricated, and mounted on the battery or the body. The contact housing 140a is preferably fabricated as one unit with the battery or the body by injection molding. A connection portion 130, connecting the first contact 110 and the second contact 120, may be mounted for external connection to the contact housing 140a. A lead line is soldered or the like to the connection portion 130 which electrically connects components within the battery and/or the body.

Figure 3C:
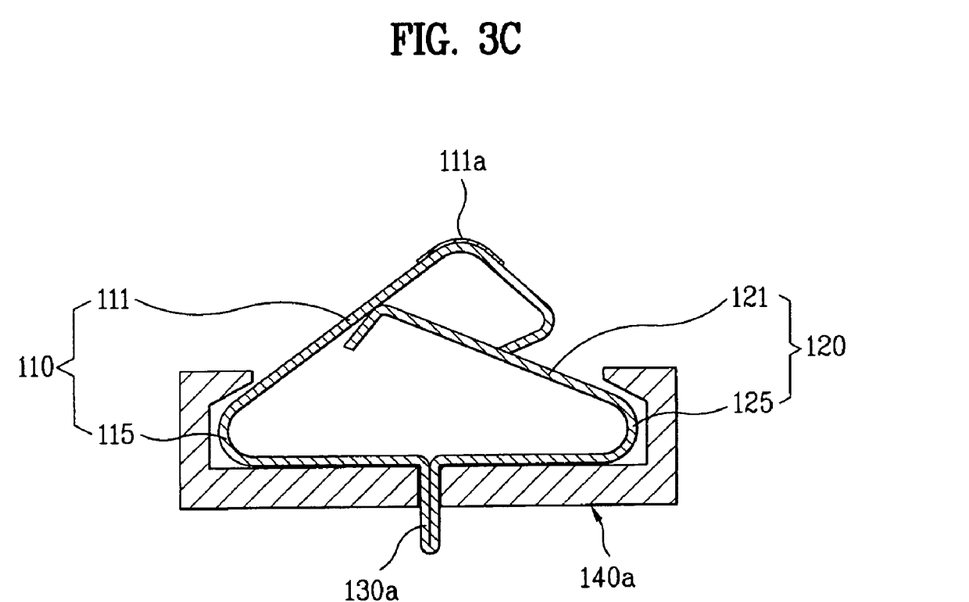
FIG. 3C illustrates a sectional view of a contact in accordance with one variation of the first preferred embodiment of the invention.

FIG. 3C illustrates a variation of the first embodiment where the connection portion 130 has a portion that projects from the contact housing 140a. The connection portion 130a may be electrically connected to other components within the battery and/or the body preferably by soldering or the like. In one alternative, a female plug is formed on the battery or the body, a portion of the connection portion 130a is inserted in the female plug for connecting the contact 120 to the battery or the body. The contact 100a electrically connects components in the body with the battery, or alternatively components in the body to each other.

The contact 100a is provided to the body, and the mating contact with the contact 100a are provided to the battery, or vice versa, when the contact 100a serves to connect the component in the body and the battery electrically, together with the mating contact.

In one example, a universal mobile telecommunication system (UMTS) data card and/or a subscriber identity module (SIM) card is mounted on a portable electronic device and provided with a mating contact. The contact 100a is provided on a main board of the body. The contact 100a and the mating contact when connected provide an electrical signal flow path from the main board to the UMTS and/or SIM card.

In another example, the contact 100a is mounted to the body. The first contact 110 is elastically pressed downward with a mating contact provided on a battery, UMTS data card, or SIM card. The contact portion 111 elastically contacts with the mating contact. An elastic force of the contact portion 111 is supplied from a first elastic portion 115 between the contact portion 111 and the connection portion 130.

When the battery, the UMTS data card, or the SIM card are mounted on the body, the first contact 110 elastically contacts the mating contact, and the second contact 120 elastically supports the first contact 110 to enhance a contact force of the first contact to the mating contact. The first elastic portion 115 maintains contact during a momentary impact by pushing the contact portion 111 toward the mating contact. The support portion 121 during the momentary impact pushes the contact portion 111 toward the mating contact by the elastic force from the second elastic portion 125.

The support portion 121 elastically supports the contact portion 111 along at least one of the end portion or the middle portion. The contact portion 111 elastically contacts with the mating contact on the battery, the UMTS data card, or the SIM card. The elastic force pushes the contact portion 111 supplied from the second elastic portion 125 between the support portion 121 and the connection portion 130.

Using this system, the battery, the UMTS data card, and/or the SIM card maintain electrically connection to components in the body even with momentary impact on the electronic device. By maintaining contact, the electrical device is prevented from experiencing a sudden loss of power, which may result in loss of data, damage to components, or the like for permitting operational reliability of the portable electronic device.

Figure 4:
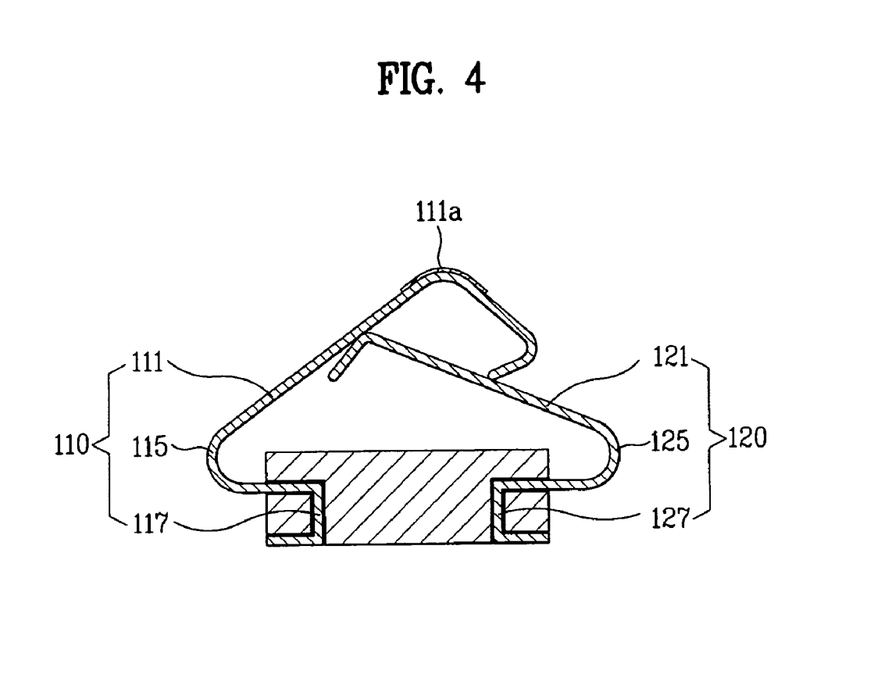
FIG. 4 illustrates a sectional view of a contact in accordance with a second preferred embodiment of the invention.

FIG. 4 illustrates a second embodiment of a present invention. In this embodiment, the contact 100b providing a first contact 110 and a second contact 120 fixedly secured to a contact housing 140b. A member for securely mounting the first contact 110 and the second contact 120 on the battery or the body includes a contact housing 140b. The first contact 110 and the second contact 120 are fixedly secured to the contact housing 140b.

The first contact 110 comprises a contact portion 111, a first elastic portion 115, and a first securing portion 117. The second contact 120 comprises a support portion 121, a second elastic portion 125, and a second securing portion 127. The structures of the contact portion 111, the first elastic portion 115, the support portion 121, and the second elastic portion are described in FIGS. 3A, 3B, and 3C.

The first securing portion 117 of the first contact 110 extends from the first elastic portion 115, and is secured to the contact housing 140b. The second securing portion 127 of the second contact 120 extends from the second elastic portion 125, and is secured to the contact housing 140b.

Either the first contact 110 or the second contact 120 is mounted on the contact housing 140b for providing electrical connection of the battery or the component in the body. At least one of the first securing portion 117 and the second securing portion 127 is mounted to pass through the contact housing 140b.

In this example, the first securing portion 117 and the second securing portion 127 are mounted to pass through the contact housing 140b. End portions of the first securing portion 117 and the second securing portion 127 project from the contact housing 140b. The contact housing 140b having the first contact 110 and the second contact 120 secured thereto is mounted on the battery or the body. The contact housing 140 remains as described in the previous embodiments.

Upon mounting the battery, the UMTS data card, or the SIM card on the body, the first contact 110 is brought into contact with the mating contact by the first elastic portion 115 between the contact portion 111 and the first securing portion 117. The second contact 120 supports the first contact 110 by the elastic force of the second elastic portion 125 between the support portion 121 and the second securing portion 127. Contact force between the first contact 110 and the mating contact is enhanced to secure operational reliability of the portable electronic device.

Figure 5A:
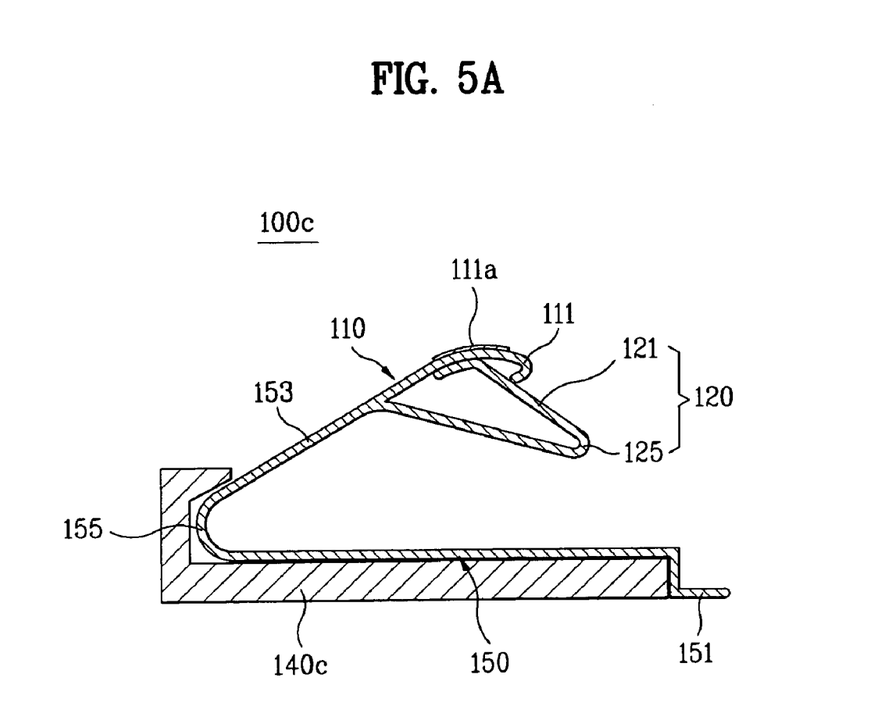
FIG. 5A illustrates a sectional view of a contact in accordance with a third preferred embodiment of the invention.
Figure 5B:
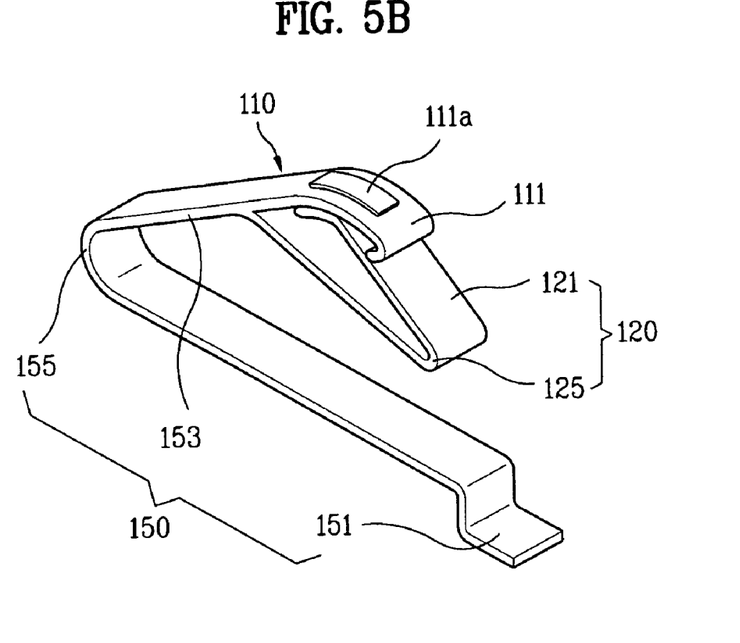
FIG. 5B illustrates a perspective view of the contact in FIG. 5A separated from the contact housing.

FIGS. 5A and 5B illustrate a contact 100c in accordance with a third preferred embodiment of the present invention. The contact 100c comprises a member for securing the first contact 110 and the second contact 120 to the battery or the body having a contact housing 140c and an elastic member 150. The elastic member 150 is mounted on the contact housing 140c, and supports the first contact 110, and the second contact 120. The elastic member 150 comprises, for an example, a first portion 151, a second portion 153, and a third elastic portion 155.

The first portion 151 is a portion electrically connected to the battery or the body. The first portion is exposed to an outside of the contact housing 140c for easy connection to a lead line connected to the battery or the body. As shown in FIGS. 5A and 5B, the second portion 153 has the first contact 110 and the second contact 120 connected thereto.

The third elastic portion 155 is provided between the first portion 151 and the second portion 153, and mounted on the contact housing 140c. The third elastic portion 155 has, for example, a curved shape, for giving an elastic force to the second portion 153 having the first contact 110 and the second contact 120 connected thereto.

The contact portion 111 of the first contact 110 has a structure identical to one described in the first or second embodiment. The first contact 110 is preferably connected to the first contact 110 for elastically bending with respect to the second portion 153. A connection portion of the second portion 153 and the first contact 110 of the first elastic portion 115 operate similarly to that of the first or second embodiment. The first contact 110 maintains an elastic force with respect to the elastic member 150. The elastic member 150 supports the first contact 110 using an elastic force of the third elastic portion 155.

The second contact 120 comprises a support portion 121 for supporting the first contact 110, and a second elastic portion 125 for giving an elastic force to the support portion 121. The support portion 121 and the second elastic portion 125 are similar to those described in the first and second embodiment. The contact 100c, in contrast to the first and the second embodiment, has the second elastic portion 125 connected to the second portion 153 of the elastic member 150.

The first contact 110, the second contact 120, and the elastic member 150 may be fabricated, for example, as single body. In another alternative, the second contact 120 and the elastic member 150 may be fabricated as single body, and the first contact 110 may be secured to the elastic member 150.

In operation, upon mounting the battery, the UMTS data card, or the SIM card on the body of the portable electronic device, the first contact 110 is elastically pressed down contacting with a mating contact. The second contact 120 pushes the first contact 110 toward the mating contact by the elastic force of the second elastic portion 125 for supporting the first contact 110. Moreover, the elastic member 150 supports the first contact 110, elastically. A contact force between the first contact 110 and the mating contact is enhanced to prevent breaking contact between the first contact 110 and the mating contact upon a momentary impact applied to the portable electronic device.

The contact 100c may be arranged such that, when the UMTS data card or the SIM card is mounted on the body of the portable electronic device, both the first contact 110 and the elastic member 150 are pressed down for elastically connecting second elastic member 125 with the elastic member 150. The second contact 120 supplements the elastic force of the first contact 110 for enhancing the contact forces or strength between the first contact 110 and the mating contact.

Figure 6:
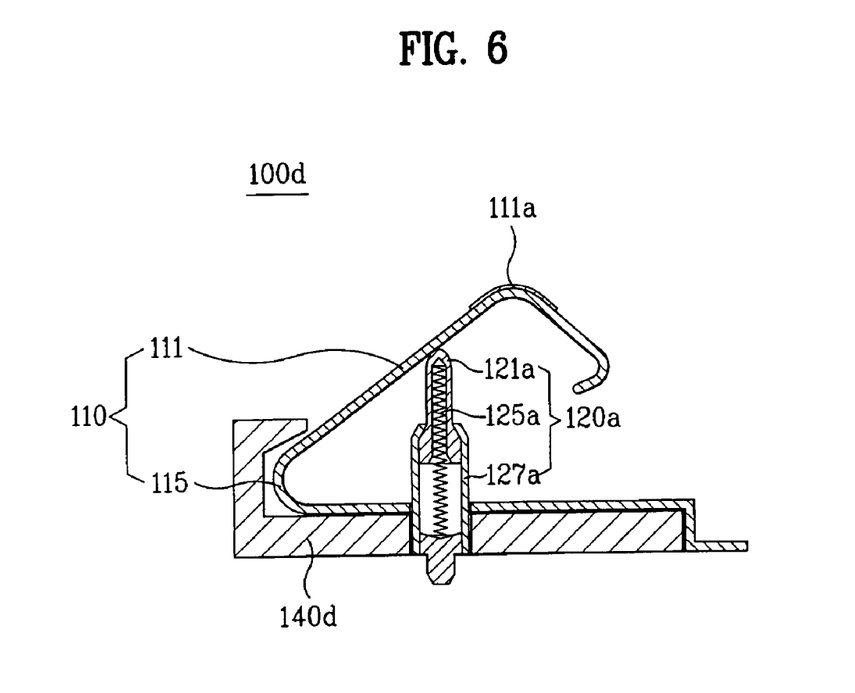
FIG. 6 illustrates a sectional view of a contact in accordance with a fourth preferred embodiment of the invention.

FIG. 6 illustrates a section of a contact 100d in accordance with a fourth preferred embodiment of the present invention. A second contact 120a supplements elastic force of a first contact 110 with the mating contact in a state the second contact 120a is inserted in the first contact 110. The first contact 110 is placed in and secured to a contact housing 140a mounted on the battery or the body. The first contact 110 includes a contact portion 111 contacting the mating contact and a first elastic portion 115 inserted in the contact housing 140a for giving elastic force to the contact portion 111.

The first contact 110 has a curved portion, and the second contact 120a inserts into the curved portion and compresses the first contact 110. The first elastic portion 115 is preferably curved to have an acute interior angle. An end portion of the first elastic portion 115 may be exposed to an outside of the contact housing 140a. This structure enables connection of an electrical line to the battery or components of the body to the first contact 110. If the second contact 120a is connected to the lead line, the first elastic portion 115 may not be exposed to the outside of the contact housing 140a.

The second contact 120a inserts in the curved portion of the first contact 110 and exerts a force opening the curved portion of the first contact 110. The second contact 120a enhances a contact force between the contact portion 111 of the first contact 110 and a mating contact. The second contact 120a, in one example, may be a compression spring. For enhancing operational reliability, the second contact 120a may include, as shown in FIG. 6, a first pin 121a, a second pin 127a, and a spring 125a.

The first pin 121a and the second pin 127a each has a cylindrical shape with one closed end such that the first pin 121a inserts into the second pin 127a. The spring 125a is placed in the first pin 121a and the second pin 127a having opposite ends thereof connected respectively to the first pin 121a and the second pin 127a.

In the second contact 120a, the first pin 121a and the second pin 127a are in contact with the interior of the curved portion of the first contact 110. The second contact 120a may be arranged to pass through the first contact 110 and the contact housing 140a. The second pin 127a of the second contact 120a is mounted to pass through a portion of the first contact 110 and the contact housing 140a.

This structure enables the first contact 110 to be, not only placed in, and secured to the contact housing 140a, but also secured to the contact housing 140a with the second contact 120a, thereby enhancing operational reliability of the contact 100a. Meanwhile, the second pin 127a, is passed through both the first contact 110 and the contact housing 140a, wherein the lead line may be electrically connected to the battery and a component of the body.

The second contact 120a, even though shaped differently, has operational features identical to the second contact 120 discussed in the above embodiments. Operational features of the second contact 120a supplement the elastic force of the first contact 110. The second pin 127a connects to the contact housing 140d. The first pin 121a supports elastically the contact portion 111 of the first contact 110. The spring provides the elastic force to the first pin 121a.

The battery, the UTMS data card, and/or the SIM card is mounted on the body. The contact portion 111 of the first contact 110 is pressed down, and elastically contacts a mating contact. In this instance, the first elastic portion 115 of the first contact 110 pushes the contact portion 111 toward the mating contact, to support the contact portion 111. The second contact 120a on the interior of the curved portion of the first contact 110 pushes the contact portion 111 toward the mating contact for supporting the contact portion 111. The second pin 127a of the second contact 120a is fixed with respect to the contact housing 140a. The first pin 121a pushes the contact portion 111 of the first contact 110 using an elastic force of the spring 125a. The second contact 120a supplements the contact force between the contact portion of the first contact 110 and the mating contact.

Figure 7:
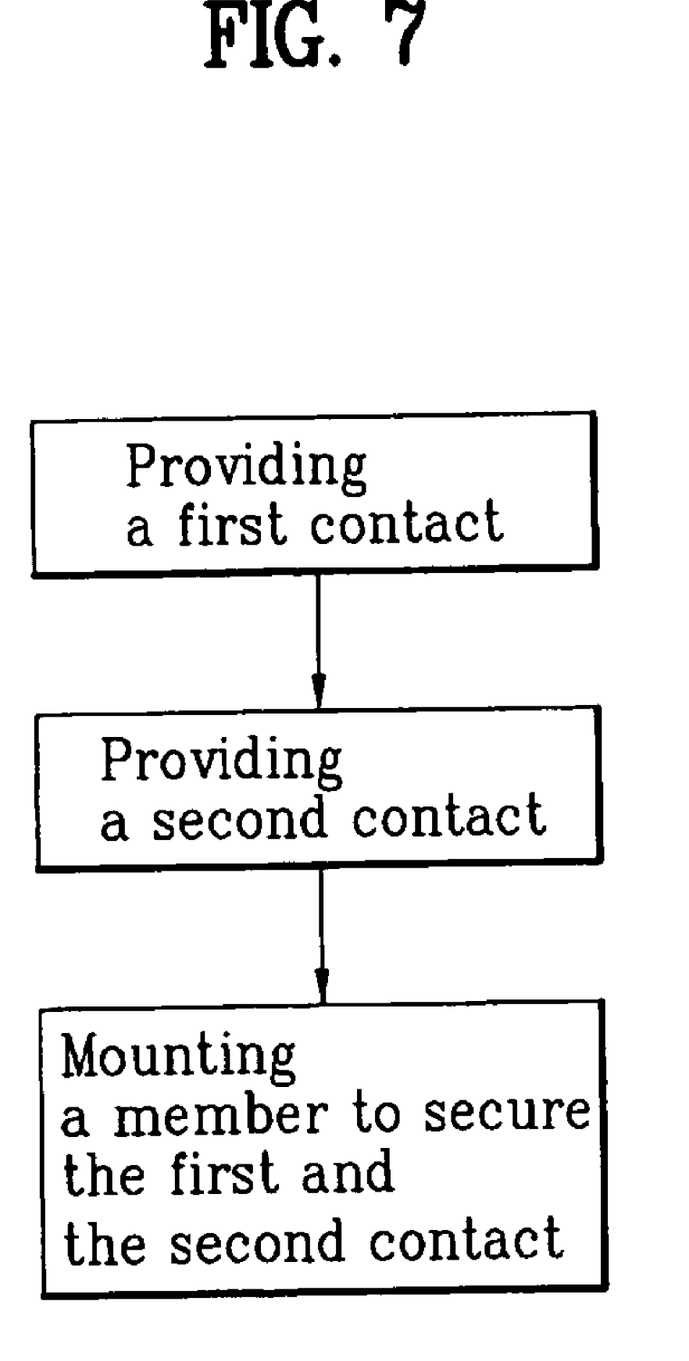
FIG. 7 illustrates a flow chart for a method in accordance with the present invention.

FIG. 7 illustrates a flow chart illustrating a method using the apparatus of the present invention. The method comprises providing a first contact for maintaining an elastic force with a mating contact (S10), pushing a second contact into the first contact toward the mating contact to support the first contact (S20), and mounting a member for securing the first contact and the second contact on at least one of a battery, a body, or a battery charger of the portable electronic device (S30). The first contact preferably projects a contact portion having a curved portion that projects outward and provides an elastic force to a first elastic portion of the contact portion. The method preferably provides an elastic force utilizing an end portion inwardly curved of the contact portion. The method may further comprise providing an elastic force utilizing the second contact on at least one of an end portion and a middle portion of the first contact.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art.

Accordingly, the invention is not limited to the precise embodiments described in detail herein above.

What is claimed is:

1. A secure contact for preventing disconnection of a contact from a mating contact for a portable electronic device, the contact comprising:

a first contact for maintaining elastic connectivity with the mating contact, wherein the first contact comprises a curved portion for inserting the second contact therein while the first contact has a compressed state:

a second contact for providing an elastic force to push the first contact toward the mating contact to support the first contact, wherein the first contact and the second contact are structured to remain in contact during compressed and uncompressed states:
a member for mounting the first contact and the second contact; and
wherein the second contact includes;
a first pin and a second pin each connected to the first contact; and
a spring having opposite ends connected to the first pin and the second pin.

2. The contact as claimed in claim 1, wherein the second contact is arranged to pass through the first contact and the contact housing.

* * * * *